A. J. SCAIFE.
BRAKE MECHANISM FOR AUTOMOBILES.
APPLICATION FILED FEB. 12, 1917.
1,245,040.
Patented Oct. 30, 1917.
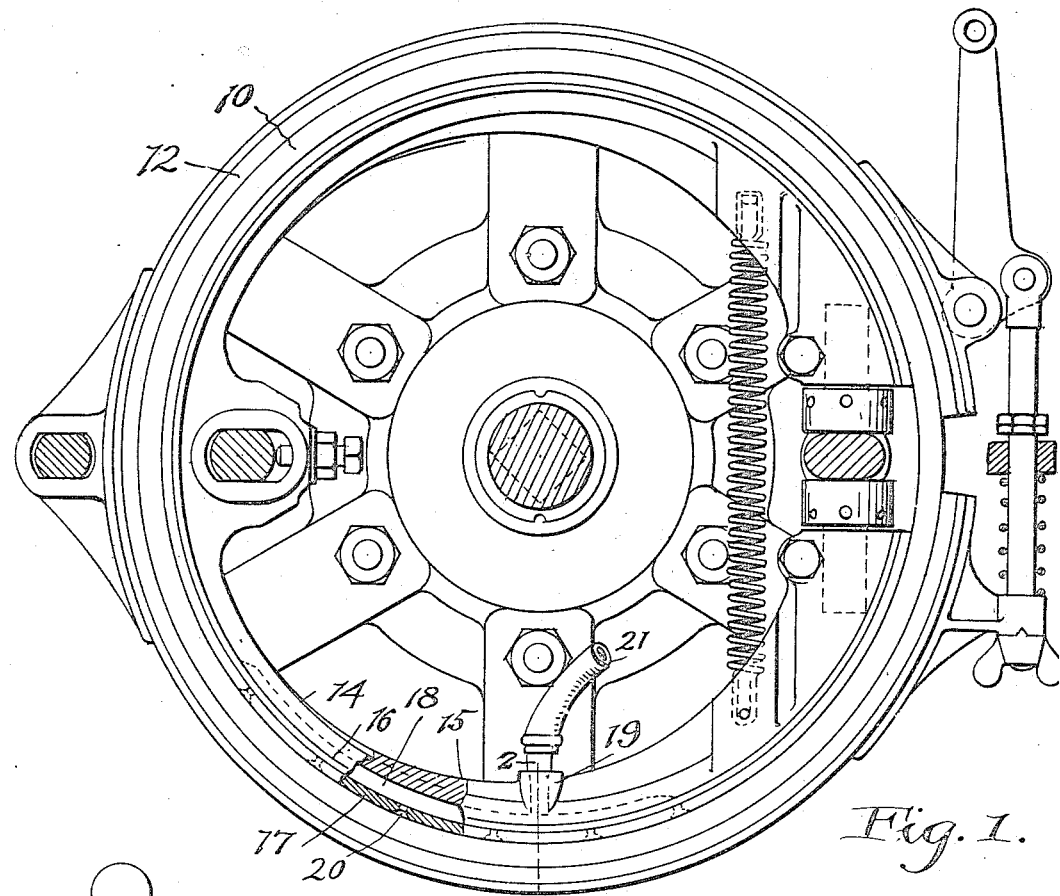
Fig. 1.
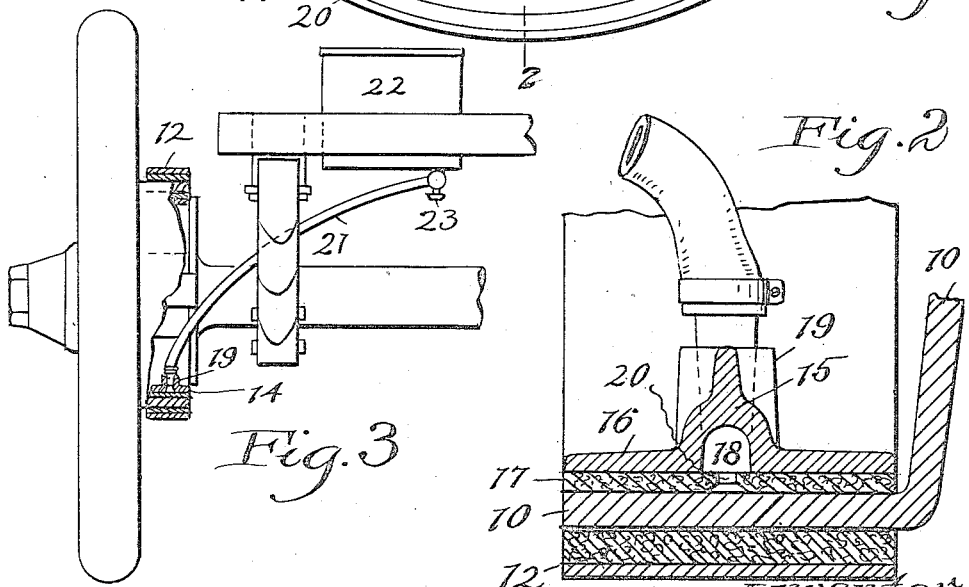
Fig. 2.
Fig. 3.
Inventor
Arthur J. Scaife
By Thurston & Kwis
attys.

UNITED STATES PATENT OFFICE.

ARTHUR J. SCAIFE, OF CLEVELAND, OHIO, ASSIGNOR TO THE WHITE MOTOR COMPANY, OF CLEVELAND, OHIO, A CORPORATION OF OHIO.

BRAKE MECHANISM FOR AUTOMOBILES.

1,245,040.   Specification of Letters Patent.   Patented Oct. 30, 1917.

Application filed February 12, 1917. Serial No. 147,973.

*To all whom it may concern:*

Be it known that I, ARTHUR J. SCAIFE, a citizen of the United States, residing at Cleveland, in the county of Cuyahoga and State of Ohio, have invented a certain new and useful Improvement in Brake Mechanism for Automobiles, of which the following is a full, clear, and exact description.

When the outside or service brake of an automobile is applied for a long time, as when the automobile is going down a long steep hill, both the brake drum and the brake band are apt to get very hot. This frequently produces two very undesirable results, to wit, it burns the brake lining, and it causes the brake drum to expand to such an extent as will prevent the brake band from becoming disengaged therefrom when it is desired to take off the brake.

The object of this invention is to prevent the heating of the brake drum and outside service brake to such a degree as will produce either of the stated objectionable results; and this object is attained by the construction and combination of parts shown in the drawing and hereinafter described and pointed out in the appended claims, through which streams of water may be discharged, constantly, onto the brake drum from the inside or emergency brake band, except when said brake band is tightened on the brake drum.

In the drawing Figure 1 is a side view partly sectioned of brake mechanism in which the present invention is embodied; Fig. 2 is a sectional view through the lower half of the inside brake band in the plane indicated by line 2—2 on Fig. 1. Fig. 3 is a view of the rear axle, tank, etc.

Referring to the parts by reference characters, 10 represents the brake drum; 12 the outside or service brake which is in the form of a split ring appropriately supported at one side, and associated with mechanism adjacent the split through the other side, by means of which this brake may be contracted upon and into engagement with the brake drum.

14 represents the inside or emergency brake which is also in the form of a split ring appropriately supported on one side, and associated with mechanism adjacent the split on the other side for expanding this brake and causing it to contact with the inner periphery of the brake drum. The mechanism above referred to, is or may be of any familiar or suitable construction, as for example, such as is shown in the White Patent No. 1,063,485.

The inside brake band comprises a cast steel body member 15, a thin metal facing strip riveted to the periphery thereof, which facing strip is usually made up of a piece of thin metal having secured to its outer surface a strip 17 commonly called the brake lining. The split body member is formed with a circumferentially extended recess 18 in its outer periphery extending through an arc of approximately 90°, and located in the lower half of said member. When the strips 16 and 17 are secured to the periphery of the member 15, this recess will be inclosed. On the side of the member 15 a boss 19 is formed, and through this boss is a hole leading to this recess. A plurality of holes 20 are formed through the facing strip 17, leading to this recess. A rubber tube 21 may be connected with the boss 19, and may lead from a water tank 22 carried in any appropriate position upon the car. A valve or cock 23 should be provided for preventing or allowing the water to flow from this tank into the rubber tube as desired, and thence into said recess 18.

When the car is about to start on a long downhill run, during which it is going to be necessary to apply the service brake 12 with greater or less force for a long continued time, this cock will be opened, and thereafter water will flow from the tank through the pipe into the recess 18 in the lower half of the emergency brake, and from thence through the holes 20 onto the brake drum, and this water will keep the brake drum cool enough to prevent either of the bad results above referred to.

If, now, it is ever necessary to stop the car, the inside or emergency brake is employed for this purpose. By the application of the emergency brake the brake lining is forced into intimate contact with the inner periphery of the brake drum and this stops up the holes 20 and for as long as this brake remains so applied, prevents the outflow of water.

Having described my invention, I claim:—

1. In brake mechanism for automobiles, the combination of a brake drum, an outside brake band, and an inside brake band,— the latter being formed with a recess and the outer periphery of said brake band having a plurality of holes through it leading to said recess, and means for delivering water into said recess.

2. In brake mechanism for automobiles, the combination of a brake drum, an outside brake band, and an inside brake band formed of a body member having a circumferentially extended recess in its outer periphery, a facing strip secured to the outer periphery of said body member covering and closing said recess and having a plurality of holes through it leading from said recess; said body member having on one side a laterally projecting lug through which is a hole leading to said recess, and means for delivering water to the recess through said perforated lug.

In testimony whereof, I hereunto affix my signature in the presence of two witnesses.

ARTHUR J. SCAIFE.

Witnesses:
E. L. THURSTON,
L. I. PORTER.